Nov. 28, 1933.                    W. H. REPP                1,937,168
                               PROJECTING LENS
                              Filed March 26, 1930

Inventor
WILLIAM H. REPP
By Frank Keifer
Attorney

Patented Nov. 28, 1933

1,937,168

UNITED STATES PATENT OFFICE 1,937,168

PROJECTING LENS

William H. Repp, Rochester, N. Y., assignor to Projection Optics Co., Rochester, N. Y.

Application March 26, 1930. Serial No. 439,192

2 Claims. (Cl. 88—57)

The object of this invention is to provide a new and improved form of projection lens combination composed of three separate lenses. This combination lens is an improvement on the so-called Taylor triplet lens or Cooke lens such as is shown in U. S. Patents 540,122 and 568,052.

Another object of the invention is to provide a triplet combination lens having two positive lenses suitably spaced apart with a negative lens between them placed directly in contact with one of the positive lenses and having substantially the same diameter as either of the positive lenses.

Another object of the invention is to provide a triplet lens having two positive lenses and one negative lens in which the positive lenses will both be plano-convex, both positive lenses being ground with the same radius and a negative lens which will be equi-concave, both sides of which will be ground to the same radius thus making a combination lens the component parts of which are ground with but two radii.

Another object of the invention is to make a triplet lens having a positive and a negative lens placed directly in contact with each other with the second positive lens suitably spaced apart therefrom with a long air space between them, the equivalent focus of which can be changed by changing the radius of curvature of the negative lens and by changing the length of the long air space between the negative lens and the positive lenses.

Another object of the invention is to provide a lens combination in which the front and rear end can be interchanged with each other and the middle lens can be turned around without changing the optical qualities of the lens.

In the drawing.

In the drawing like reference numerals indicate like parts.

Figure 1:
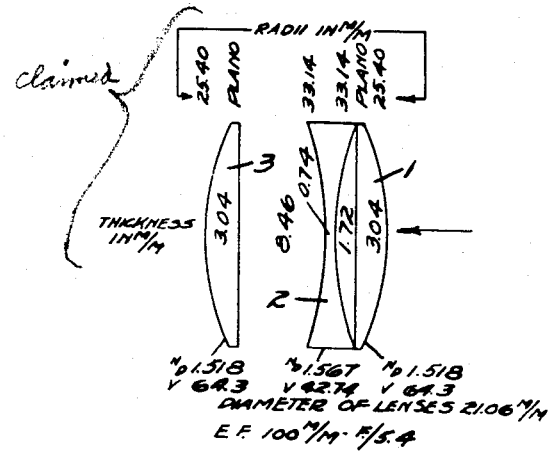
Figure 1 is a sectional elevation of the three lenses of my improved projection lens.

In the drawing reference numeral 1 indicates a positive lens and reference numeral 3 indicates a positive lens, both of which lenses are exactly alike and are plano on one side and are ground with the same radius of curvature on the other side. Reference numeral 2 indicates a negative lens placed between the two positive lenses both sides of which are equi-concave being ground with the same radius of curvature. As shown in Figure 1 it will be understood that the equi-concave lens 2 is of substantially the same diameter as the two positive lenses 1 and 2. This is desirable because it permits the two lenses to be put directly in contact with each other as is shown in Figure 1. Theoretically, the equi-concave lens 2 can be of smaller diameter than either of the plano convex lenses 1 and 3 without interfering with the transmission of light therethrough but in such case the two lenses will have to be spaced apart with a spacing ring.

It will be understood that the focal length of a lens according to my invention can be changed within small limits by using the same positive lenses and changing the radius of curvature of the negative lens and by also changing the spacing between the one lens and the other two lenses. It will also be understood that for a given distance between the lens and the screen the focal length of the lens will vary approximately with the magnification. That is, to say, the distance between the lens and the screen divided by the focal length of the lens will give the magnification approximately and the distance between the lens and the screen divided by the magnification will give approximately the focal length or equivalent focus of the lens.

Figure 2:
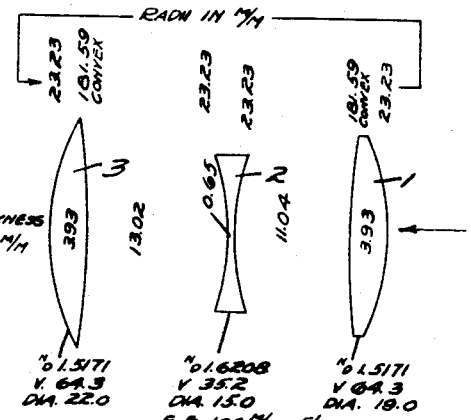
Figure 2 is a sectional elevation of a modified form of my projection lens in which but two radii are used in the curves thereof.

Assuming that the characteristics of the lens as shown in Figures 1 and 2 are correct, the focal length of the lens would be doubled by multiplying the figures by 2 and the focal length would be cut in half by dividing the figures by 2.

It will also be understood that any other factor or divisor could be used with like effect. It will also be understood that the lens shown in Figure 1 has a focal length or equivalent focus of 100 mm., and this focal length can be increased to 105 mm. or decreased to 95 mm. by changing the radius of curvature of the negative lens using the positive lenses with the same curvature as is given. The change in the radius of curvature in the negative lens is easily estimated by calculation. It will also be understood that in carrying out the series I would estimate the curvature of the positive lenses for a focal length of 115 mm. and use those same positive lenses in triplets having a focal length of 110 mm., and a 120 mm. by changing the radius of curvature of the negative lens. In like manner, the series would be carried on by increasing the focal length as much as would be desired to cover all the measurements that would be needed to fit all the conditions under which projection lenses are ordinarily called upon to work for commercial purposes.

It will be understood from the foregoing that six positive lenses can be made all exactly alike and three negative lenses can be made each differing from each other in their curvatures and from these lenses three triplets can be assembled which will have different focal lengths.

It will also be understood that six other positive lenses can be made all exactly alike and three negative lenses can be made each differing from each other in the radius of curvature as above explained and from these lenses can be assembled three triplets which will have still other focal lengths and in this way the series can be carried out indefinitely increasing the focal length or decreasing it as may be desired so that between the limits of the focal length of 100 mm. and 200 mm. but seven different kinds of positive lenses need be made and 20 different kinds of negative lenses will be needed. It will also be understood that the negative lenses will be made of the same diameter as the positive lenses and the negative lens will be assembled directly in contact with one of the positive lenses and will automatically space itself correctly from the positive lens while the other positive lens will be spaced as will be determined by calculation.

In Figure 2 I have shown 3 lenses made on the same principle of my invention. That is, in which but two curves are used in the three lenses. In this case the curves of the outer surfaces of the positive lenses are the same as the curves of the surfaces of both surfaces of the negative lens and the curves of the inner surfaces of the positive lenses have a longer radius. In this case, the equivalent focus or focal length is given as 100 mm. and the curve of the longer radius would be used for triplets having 95 mm. and 105 mm. focal length. In the positive lenses all the lenses of a series of three focal lengths would be ground with a long radius and then finished by grinding with the short radius corresponding to the change in radius of the negative lens. Manufacture of the lenses according to the plan shown in Figure 2 is obviously not as desirabe as the manufacturing according to the plan shown in Figure 1. The lens shown in Figure 1 is more cheaply made and more easily and accurately assembled and is therefore more desirable for commercial manufacturing and use although the same principle of the invention applies to both series.

Figure 3:
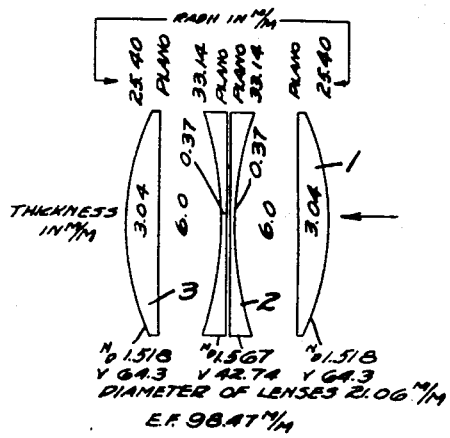
Figure 3 is a sectional view of the lenses shown in Figure 1 arranged for use as a copying lens.
Figure 4:
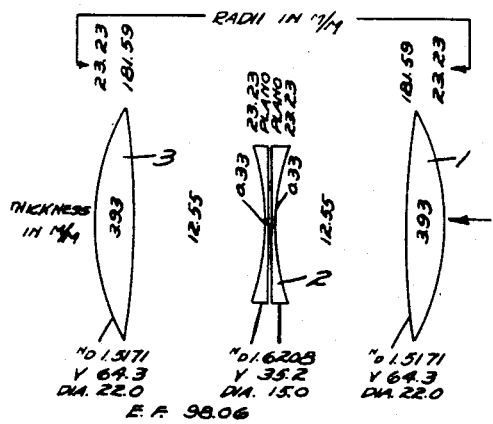
Figure 4 is a sectional view of the lenses shown in Figure 2 arranged for use as a copying lens.

In Figure 3 I have shown the same lenses shown in Figure 1 differently spaced apart for the purpose of being used as a copying lens and in Figure 4 I have shown the same lenses shown in Figure 2 differently spaced apart and used as a copying lens it being understood that a copying lens is used to copy a picture and make an image of it substantially the same diameter or thereabouts while a projection lens is intended to magnify the picture many diameters.

Having thus described my invention, I will now give the data for a set of the lenses, the equivalent focus of which is 100 mm. All the dimensions are expressed in millimeters. The slide is assumed to be at the right, and the magnified image is assumed to be at the left. The notations are those which are ordinarily used.

$r_1$, $r_2$, $r_3$ the first, second, third radius.
$d_1$, $d_2$, $d_3$ the first, second, third axial lens thickness.
$\Delta_1$, $\Delta_2$ the first, second air space.
$n_D$ = the index for the yellow (D line) of the solar spectrum.
$\nu$ = Abbes figure = $\dfrac{n_D - 1}{n_F - n_C}$, where $n_F$ and $n_C$ represent the indices for green and red (F line, C line).

*Example No. 1.  F/5.4*

| Radii | Thick. sep. | Lens | Glass | $n_D$ | $\nu$ |
|---|---|---|---|---|---|
| $r_1$   25.40 | $d_1$ 3.04 | I | Borosilicate crown | 1.518 | 64.3 |
| $r_2$   ∞ | $\Delta_1$ 8.46 | | | | |
| $r_3$  −33.14 | $d_2$ 0.74 | II | Light flint | 1.567 | 42.74 |
| $r_4$  +33.14 | | | | | |
| $r_5$   ∞ | $\Delta_2$ 1.72 | | | | |
| $r_6$  −25.40 | $d_3$ 3.04 | III | Borosilicate crown | 1.518 | 64.3 |

*Example No. 2*

| Radii | Thick sep. | Lens | Glass | $n_D$ | $\nu$ |
|---|---|---|---|---|---|
| $r_1$   23.23 | $d_1$ 3.93 | I | Boros. crown | 1.5171 | 64.3 |
| $r_2$ −181.59 | $\Delta_1$ 13.02 | | | | |
| $r_3$  −23.23 | $d_2$ 0.65 | II | Dense flint | 1.6208 | 36.2 |
| $r_4$  +23.23 | $\Delta_2$ 11.04 | | | | |
| $r_5$  181.59 | $d_3$ 3.93 | III | Boros. crown | 1.5171 | 64.3 |
| $r_6$  −23.23 | | | | | |

I claim:

1. A projection lens of the Cooke type made up of two convex lenses, the weaker surfaces of which face each other with an equiconcave lens between them, the outer lenses being interchangeable and the inner lens being placed between and directly in contact with one of the outer lenses, the so-called Cooke lens consisting of three lenses separated by two air spaces, the outer two being positive elements and the inner a negative element.

2. A projection lens of the Cooke type having the rear elements directly in contact, thereby eliminating a spacing ring and a spacing element for the negative mount, the so-called Cooke lens consisting of three lenses separated by two air spaces, the outer two being positive elements and the inner a negative element.

WILLIAM H. REPP.